US010280013B2

(12) United States Patent
Gondoh et al.

(10) Patent No.: US 10,280,013 B2
(45) Date of Patent: May 7, 2019

(54) ARTICLE LOADING FACILITY

(71) Applicant: Daifuku Co., Ltd., Osaka-shi (JP)

(72) Inventors: Takuya Gondoh, Tokyo (JP); Masami Iwai, Tokyo (JP); Atsushi Minoo, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 15 days.

(21) Appl. No.: 15/848,463

(22) Filed: Dec. 20, 2017

(65) Prior Publication Data

US 2018/0178992 A1 Jun. 28, 2018

(30) Foreign Application Priority Data

Dec. 26, 2016 (JP) ................................ 2016-251486

(51) Int. Cl.

| | |
|---|---|
| ***B65G 47/91*** | (2006.01) |
| ***B65G 47/52*** | (2006.01) |
| ***B65G 1/04*** | (2006.01) |
| ***B65G 1/137*** | (2006.01) |
| *B65G 47/24* | (2006.01) |

(52) U.S. Cl.

CPC ......... *B65G 47/917* (2013.01); *B65G 1/0421* (2013.01); *B65G 1/0485* (2013.01); *B65G 1/1378* (2013.01); *B65G 47/52* (2013.01); *B65G 47/915* (2013.01); *B65G 47/24* (2013.01); *B65G 2201/02* (2013.01); *B65G 2203/0225* (2013.01); *B65G 2203/0233* (2013.01);

(Continued)

(58) Field of Classification Search

CPC combination set(s) only.
See application file for complete search history.

(56) References Cited

U.S. PATENT DOCUMENTS 5,456,058 A * 10/1995 Ziegler .................. B65B 5/106 53/157
5,562,403 A * 10/1996 Winski ................ B65G 47/086 414/790.9

(Continued)

FOREIGN PATENT DOCUMENTS

JP 201540120 A 3/2015

*Primary Examiner* — Kyle O Logan
(74) *Attorney, Agent, or Firm* — The Webb Law Firm

(57) ABSTRACT

An article loading facility includes an imaging device configured to capture an image of an article in a support member, and a weighing device configured to measure a weight of an article W in the support member. A controller is configured to perform a first determining operation, a second determining operation, and a third determining operation. The first determining operation is an operation in which an attitude and position of an article placed in the support member is determined based on image information from the imaging device. The second determining operation is an operation in which it is determined whether it is possible to place a target article in the support member in an attitude and position indicated by arrangement information based on arrangement information and attitude and position information obtained in the first determining operation. The third determining operation is an operation in which it is determined whether an article W is properly placed in the support member based on the arrangement information, weight information, the attitude and position information, and measured weight information measured by the weighing device.

4 Claims, 8 Drawing Sheets

(52) U.S. Cl.
CPC ................ *B65G 2203/0258* (2013.01); *B65G 2203/041* (2013.01); *B65G 2203/042* (2013.01)

(56) References Cited

U.S. PATENT DOCUMENTS

| | | | | |
|---|---|---|---|---|
| 5,700,128 | A * | 12/1997 | Tonnigs | B65G 47/914 414/728 |
| 5,758,474 | A * | 6/1998 | Ziegler | B65B 5/106 53/153 |
| 6,055,462 | A * | 4/2000 | Sato | B25J 9/1687 700/217 |
| 6,971,833 | B1 * | 12/2005 | Freudelsperger | B65G 1/0407 414/268 |
| 7,287,952 | B2 * | 10/2007 | Ricci | B07C 1/04 414/796.6 |
| 9,233,805 | B2 * | 1/2016 | Nyquist | B65G 65/00 |
| 2007/0059132 | A1 * | 3/2007 | Akamatsu | B65G 1/0421 414/274 |
| 2012/0078411 | A1 * | 3/2012 | Shimamura | H01L 21/67276 700/215 |
| 2012/0327224 | A1 * | 12/2012 | Nomura | B25J 9/1671 348/139 |
| 2014/0069775 | A1 * | 3/2014 | Ueda | B65G 1/0421 198/470.1 |
| 2014/0079524 | A1 * | 3/2014 | Shimono | B25J 9/1669 414/796.9 |
| 2014/0157732 | A1 * | 6/2014 | Gasber | B65B 25/008 53/473 |
| 2015/0045937 | A1 * | 2/2015 | Yamamoto | B65G 1/04 700/121 |
| 2015/0246778 | A1 * | 9/2015 | Koga | B25J 9/1697 700/259 |
| 2016/0001445 | A1 * | 1/2016 | Setsuda | B25J 9/1679 700/260 |
| 2016/0083199 | A1 * | 3/2016 | Nishizaka | B65G 47/905 414/567 |
| 2016/0151916 | A1 * | 6/2016 | Kanno | B25J 9/1697 700/228 |
| 2016/0229062 | A1 * | 8/2016 | Suzuki | B25J 9/1697 |
| 2017/0129101 | A1 * | 5/2017 | Sonoda | B25J 9/1687 |
| 2017/0132045 | A1 * | 5/2017 | Fujiwaka | G06F 11/3447 |
| 2017/0146341 | A1 * | 5/2017 | Kimoto | B65G 61/00 |
| 2017/0154397 | A1 * | 6/2017 | Satou | B25J 13/08 |

* cited by examiner

Fig.6
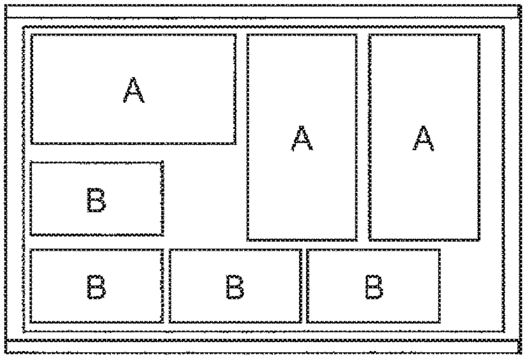
Fig.7
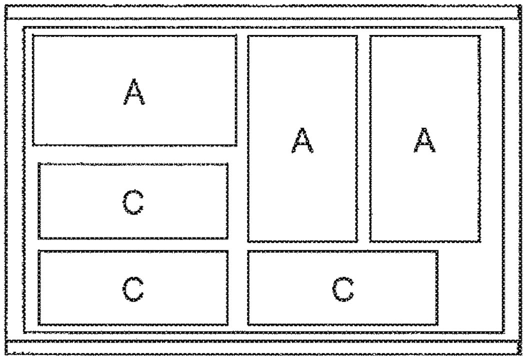
Fig.8
| Order No. | Goods code | Quantity |
|---|---|---|
| 001 | A | 3 |
| 001 | C | 3 |
| 001 | B | 5 |
| 001 | D | 2 |

ARTICLE LOADING FACILITY

CROSS-REFERENCE TO RELATED APPLICATION

This application claims priority to Japanese Patent Application No. 2016-251486 filed Dec. 26, 2016, the disclosure of which is hereby incorporated in its entirety by reference.

FIELD OF THE INVENTION

The present invention relates to an article loading facility in which a loading member, configured to load one or more target articles into a support member into which a plurality of articles can be loaded, is controlled.

BACKGROUND

An example of article loading facilities such as one described above is described in the JP Publication of Application No. 2015-040120 (Patent Document 1). In the article loading facility of Patent Document 1, articles to be loaded to support members are stored in an automated warehouse. And a stacker crane and a transport conveyor transports articles stored in the automated warehouse to a transfer location, one article at a time. In the article loading facility of Patent Document 1, a controller operates a transfer robot (loading section) to load a target article (an article transported to the transfer location) into a roll box pallet (first support member) such that the article is placed in an attitude and position in the roll box pallet indicated by arrangement information.

SUMMARY OF THE INVENTION

With the article loading facility described in Patent Document 1, a target article to be loaded into a support member may not be loaded, for example, because the transfer robot drops the target article while holding and loading it into a roll box pallet. In addition, when there are different kinds of articles, an article of a different kind from a target article (i.e., a wrong kind of article) may be loaded into a support member. Thus, it is necessary to properly determine whether a target article that should be loaded into a support member has actually been loaded into the support member; thus, inexpensive arrangement for performing such determination is desired.

Accordingly, an article loading facility is desired that is capable of determining whether a target article that should be loaded into a support member has actually been loaded into the support member and that can provide an arrangement inexpensively for performing such determination.

In light of the above, an article loading facility comprises: a loading member configured to load a target article into a support member into which a plurality of articles can be loaded; a controller configured to control the loading member; a setting portion configured to perform an arrangement setting operation to set arrangement information that indicates an attitude and position of each of the one or more target articles to be loaded into the support member, with respect to the support member; wherein the controller is configured to control the loading member based on the arrangement information such that each of the one or more target articles is placed in the support member in an attitude and position indicated by the arrangement information.

Further provided are: an imaging device configured to capture an image of at least one article placed in the support member; a weighing device configured to measure a weight of at least one article placed in the support member; a memory configured to store weight information which is information that indicates a weight of each of the one or more target articles; wherein the controller is configured to perform a first determining operation, a second determining operation, and a third determining operation, wherein the first determining operation is an operation in which an attitude and position of at least one article that is placed in the support member is determined based on image information which is information captured by the imaging device, wherein the second determining operation is an operation in which it is determined whether it is possible to place a target article in the support member in an attitude and position indicated by the arrangement information based on the arrangement information and attitude and position information which is information about the attitude and position of the at least one article determined by the first determining operation, and wherein the third determining operation is an operation in which it is determined whether at least one article is properly placed in the support member based on the arrangement information, the weight information, the attitude and position information, and measured weight information which is information measured by the weighing device.

With the arrangement described above, the controller can, in the first determining operation, cause the imaging device to capture an image of at least one article placed in the support member and also can determine the attitude and position of the at least one article placed in the support member based on the image information captured by the imaging device. In other words, by performing the first determining operation before loading a target article into the support member, the controller can determine the positions and attitudes of one or more articles already placed in the support member before the loading of the target article. In addition, by performing another first determining operation after placing the target article in the support member, the controller can determine the positions and attitudes of the articles placed in the support member, including the target article.

And the controller can, in the second determining operation, determine whether it is possible to place the target article (to be loaded next into the support member) in the support member in the position and attitude indicated, or specified, by the arrangement information based on the attitude and position information (information about the attitude and position of at least one article placed in the support member) obtained by performing the first determining operation performed before loading the target article into the support member and on the arrangement information (information about the position and attitude of the target article to be loaded next into the support member).

The controller can, in the third determining operation, determine whether the article has been properly placed in the support member in the position and attitude indicated by the arrangement information based on the arrangement information and on the attitude and position information obtained by performing another first determining operation after placing the target article in the support member. In addition, the controller can, in the third determining operation, determine whether the article of the kind indicated by the arrangement information has been properly placed in the support member based on the arrangement information and the measured weight information. As such, it is possible to make a determination as to whether the article placed in the support member is in the position and attitude, and also is of the kind, as indicated by the arrangement information, based on the image information from the imaging device and the measured weight information from the weighing device. A proper responsive action can be taken if and when the article placed in the support member is not in the position and attitude as indicated by the arrangement information, or if and when the article placed in the support member is not of the kind indicated by the arrangement information. In addition, since the imaging device for performing the second determining operation is used as the imaging device for performing the third determining operation, the arrangement for performing the third determining operation can be provided inexpensively.

BRIEF DESCRIPTION OF THE DRAWINGS

FIG. 6 shows the first or bottom layer of articles when articles are loaded in the order of goods codes A, B, C, and D, FIG. 7 shows the first or bottom layer of articles when articles are loaded in the order of goods codes A, C, B, and D, FIG. 8 shows order information after changing the ordering, FIG. 9 showing the order in which articles are transported to a second position.

DETAILED DESCRIPTION

1. Embodiment

Embodiments of an article loading facility are described with reference to attached drawings.

Figure 1:
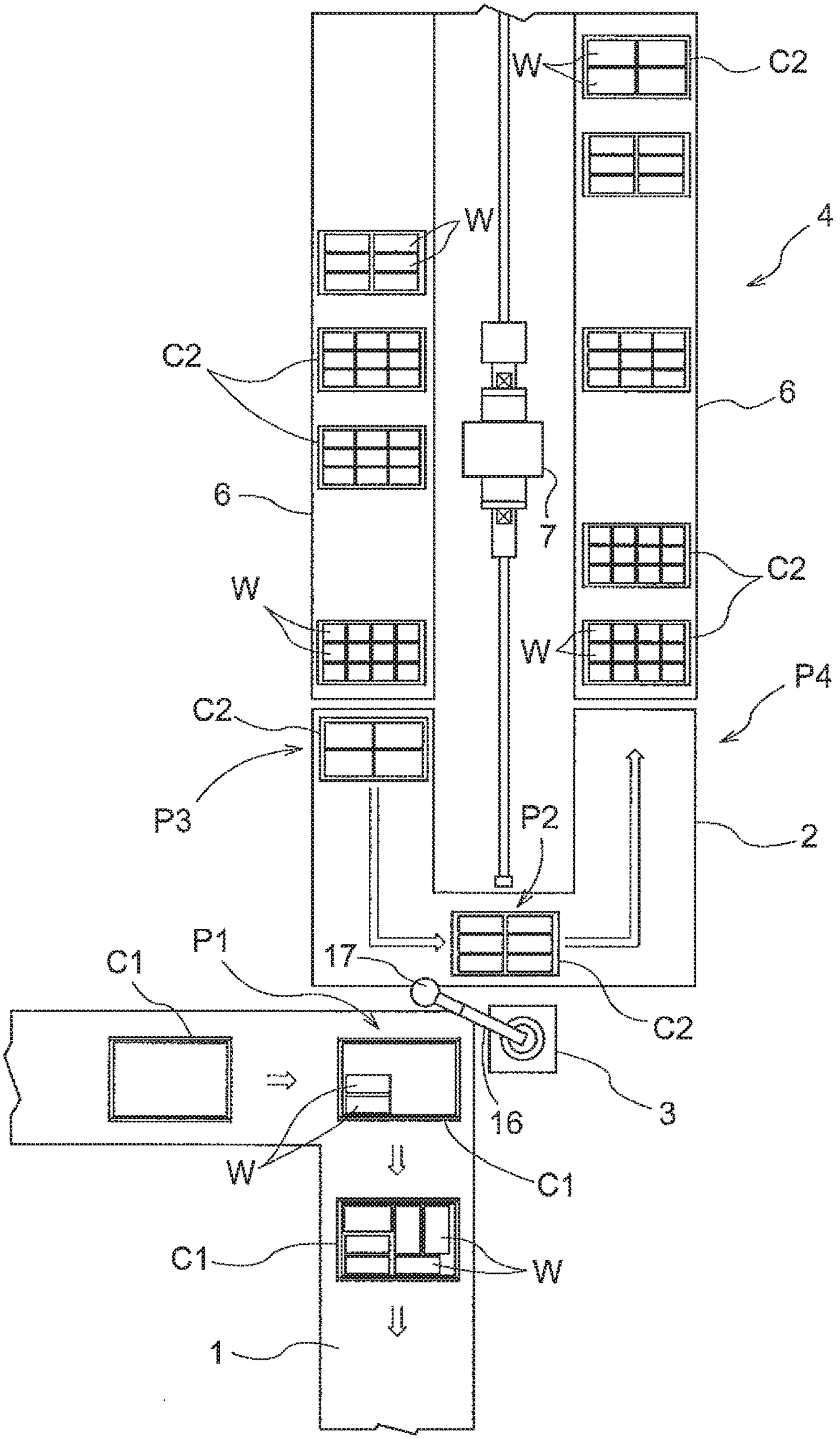
FIG. 1 is a plan view of an article transport facility.

As shown in FIG. 1, an article loading facility includes a first transport device 1 configured to transport first containers C1, a second transport device 2 configured to transport second containers C2, and a transfer device 3 configured to transfer articles W held in a second container C2 to a first container C1 to place the articles W in the first container C1, one article W at a time. In addition, the article loading facility includes an automated warehouse 4 configured to store second containers C2.

(Automated Warehouse)

As shown in FIG. 1, the automated warehouse 4 includes storage racks 6 each configured to store second containers C2, and a stacker crane 7 configured to transport second containers C2, one at a time. Each storage rack 6 includes a plurality of storage locations arranged next to another along a travel direction of the stacker crane 7 and one above another along a vertical direction. Each storage rack 6 is configured to store a plurality of second containers C2 with a second container C2 stored at each storage location.

In the automated warehouse 4, a second container C2 stored in a storage rack 6 is transported to a carry-out position P3 by the stacker crane 7 to be taken or carried out of the automated warehouse 4: and, a second container C2 located at a carry-in position P4 is transported to a storage rack 6 by the stacker crane 7 to be carried into the automated warehouse.

(First Transport Device and Second Transport Device)

The first transport device 1 consists of one or more conveyors, such as roller conveyors, to perform one-way transporting of first containers C1. A first position P1 is defined at an intermediate location in a transporting path of the first transport device 1. The first transport device 1 transports a first container C1 to the first position P1 from a transport origin (not shown) and transports the first container C1 from the first position P1 to a transport destination (not shown). No articles W are held in a first container C1 transported to the first position P1 by the first transport device 1; however, articles W transferred by the transfer device 3 are held in the first container C1 when transported from the first position P1 by the first transport device 1.

The second transport device 2 consists of one or more conveyors, such as roller conveyors, to perform one-way transporting of second containers C2. The carry-out position P3 is defined at an upstream end of the transporting path of the second transport device 2 while the carry-in position P4 is defined at a downstream end of the transporting path of the second transport device 2. And a second position P2 is defined at an intermediate location in a transporting path of the first transport device 1. The second transport device 2 transports a second container C2 from the carry-out position P3 to the second position P2, and transports the second container C2 from the second position P2 to the carry-in position P4. The one or more articles W are held in the second container C2 transported to the second position P2 by the second transport device 2. And any one article W held in any given second container C2 is of the same kind as any other article W held in the same container C2.

As such, in the article loading facility, an empty first container C1 is transported to the first position P1 by the first transport device 1: a second container C2 holding one or more articles W are carried out or retrieved from the automated warehouse 4 by the stacker crane 7: and, the retrieved second container C2 is transported to the second position P2 by the second transport device 2.

And the transfer device 3 takes an article W out of the second container C2 located at the second position P2 and transfers the article W from the second container C2 to the first container C1 to place, the article W that has been taken out, in the first container C1 located at the first position P1. When all articles W that should be taken out have been taken out of the second container C2, the second container C2 is transported from the second position P2 by the second transport device 2, and is carried into, and is stored in, the automated warehouse 4. The first container C1, which now holds all articles W that should be held therein, is transported from the first position P1 by the first transport device 1. In the following description, among all the articles W, any article W in the process of being transferred by the transfer device 3 as well as any article W that is held in a second container C2 and that is to be transferred by the transfer device 3 will be referred to as a target article TW. In addition, any article W indicated or specified by arrangement information described below will also be referred to as a target article TW.

Note that a storage rack 6 is, or corresponds to, a storage area for storing second containers C2 (second support members). In addition, the stacker crane 7 and the second transport device 2 form a transporting portion configured to transport a second container C2 from the storage rack 6 to the second position P2 (transfer position) and to transport the second container C2 from the second position P2 to the storage rack 6.

(Containers)

Figure 2:
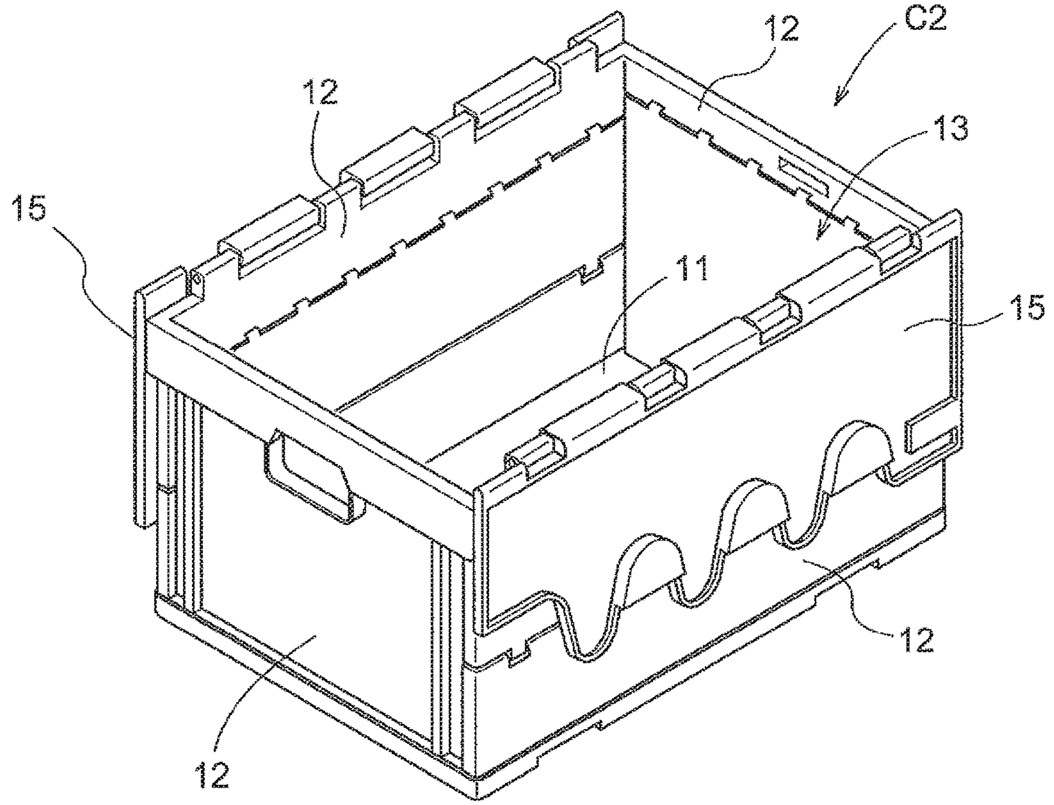
FIG. 2 is a perspective view of a first container.

As shown in FIG. 2, each first container C1 has a rectangular support portion 11 for supporting articles W from below, and side wall portions 12 each of which rises, or extends vertically, from corresponding one of four sides which form outer edges of the support portion 11. And thus each first container C1 is formed to have a general shape of a box with an opening 13 at the top or in place of a top surface. In addition, each first container C1 includes lids 15 which are capable of being switched between a closed state in which the opening 13 at the top is closed and an open state in which the opening 13 at the top is left open. Each first container C1 can hold articles W with the articles W loaded on the support portion 11 such that the articles W are arranged in one layer, or in multiple-layers. Articles being arranged in one layer means that the articles are arranged such that no article is placed above any other. And articles being arranged in multiple-layers means that the articles are arranged such that at least one article is placed above another.

As with the first container C1, each second container C2 is formed to have a general shape of a box with an opening 13 at the top or in place of a top surface to hold articles W with the articles W supported from below by a support portion 11. Note that no lid 15 is provided to the second containers C2.

In the present embodiment, the foldable resin containers are used as the first and second containers C1, C2. Note that containers without any lid 15 may be used as first containers C1.

For each of the first containers C1 and second containers C2, volume in which articles W can be held in a container can be calculated from its inner dimensions. For a container with lids 15 (first container C1), for example, the volume in question can be derived by multiplying the three inner dimensions, i.e., inner width×inner length×inner height (with the inner height being the dimension from the top surface of the support portion 11 to the bottom surfaces of the lids 15 in the closed state). And for a container without a lid 15 (second container C2), the volume in question can be derived by multiplying the three inner dimensions, i.e., inner width×inner length×inner height (with the inner height being the dimension from the top surface of the support portion 11 to the top edges of the side wall portions). In addition, after an article W is "loaded" into the first container C1 (or the second container C2), the article W is said to be "held" in the first container C1 (or the second container C2) in the present embodiment.

Note that a first container C1 is, or corresponds to, a first support member (support member) into which a plurality of articles W can be loaded whereas a second container C2 is, or corresponds to, a second support member provided separately from the first support member.

Each article W has a general shape of a rectangular parallelepiped. And there are a plurality of kinds of articles W. A unique goods code is assigned to each of the plurality of kinds of articles W. And a display 14, with a barcode indicating the goods code printed on it, is attached to each article W. Note that code information is, or corresponds to, kind information which indicates, or specifies, the kind of a given article W whereas a display 14 is, or corresponds to, detected portion with kind information.

The articles W of the same kind have identical length, width, and height. In other words, two articles W have identical length, width, and height if the two articles W are of the same kind. However, if two articles W are of different kinds, then the two articles W may have the identical length, width and height or, at least one, or all, of length, width, and height of one article W may be different from that or those of the other article W. In addition, articles W of the same kind have an identical weight. In other words, two articles W have identical weight if the two articles W are of the same kind. However, if two articles W are of different kinds, then the two articles W may have the identical weight or, the weight of one article W may be different from that of the other article W. In addition, articles W of the same kind have the same surface pattern. A surface pattern may be of any design such as a geometrical, ornamental, or natural design that may be printed, drawn, attached, etched or otherwise made visible to a camera, on or into one or more surfaces of an article W. In other words, two articles W have identical surface pattern if the two articles W are of the same kind. However, if two articles W are of different kinds, then the surface pattern of one article W may be different from that of the other article W in part or in its entirety. In short, the articles W includes a plurality of kinds of articles W whose surface patterns differ from one kind to another and a plurality of kinds of articles W whose weights are different from one kind to another.

The plurality of kinds of articles W are held in second containers C2 in accordance with the kind. In other words, each second container C2 holds one or more articles W of the same kind. One or more articles W transferred from one second container C2 or one or more articles W transferred from a plurality of second containers C2 will be held in any given first container C1. Thus, one kind of article(s) W may be held in a first container C1 or a plurality of kinds of articles W may be held in a first container C1.

The articles W are held in any second container C2 in their respective proper attitudes. To describe this in more detail, two surfaces (of any given article W), that are parallel to each other and that are specified in advance, are defined to be supported surfaces. Then each article W is held in a second container C2 such that the article W is in an attitude (proper attitude) in which the supported surfaces are parallel to the bottom surface of the second container C2 (i.e., the top surface of the support portion 11). In other words, even if an article W in a proper attitude is turned upside down, the article W would still be in a proper attitude. And even if an article W in a proper attitude is rotated about an axis that is perpendicular to the supported surfaces, the article W would still be in a proper attitude. Articles W are transferred to a first container C1, one by one, by the transfer device 3 so that the articles W are placed in the first container C1 in their proper attitudes. And with an article W in its proper attitude, the dimension of the article W along the vertical direction is referred to as the "height" of the article W: the dimension of the article W along a longer side (i.e., along its longitudinal direction) as seen along the vertical direction is referred to as its "length": and, the dimension of the article W along a shorter side as seen along the vertical direction is referred to as its "width".

(Transfer Device)

The transfer device 3 includes an articulated arm 16 with one or more joints, and a suction pad or cup 17 supported at the distal end of the arm 16 so that an article W can be attached to and supported by the suction pad 17 because of a negative pressure developed between the cup and the article W. The negative pressure is a pressure lower than the ambient atmospheric pressure, sufficient to support articles W, and may be developed by a vacuum pump pneumatically connected to the lower surface of the suction pad 17. And the transfer device 3 removes an article W from a second container C2 located at the second position P2 and places the article W in the first container C1 located at the first position P1 to transfer the article W from the second container C2 to the first container C1.

The suction pad 17 is configured to be pivoted about a vertical axis and about a horizontal axis, with respect to the arm 16. Thus, by bending and straightening one or more joints of the arm 16 and by pivoting the suction pad 17 with respect to the arm 16, the attitude of the article W attached to the suction pad 17 can be changed about the vertical axis and the horizontal axis.

The transfer device 3 is configured to perform an transfer operation in which an article W is transferred from a second container C2 to a first container C1. This transfer operation includes attaching and supporting the top surface of an article W (in a certain attitude and held in a second container C2) to and with the suction pad 17 by developing a negative pressure between the top surface and the suction pad 17, then moving the article W to directly above the support portion 11 of the first container C1 such that the article W is in the same attitude as when the article W was first attached to the suction pad 17, and subsequently releasing the article from the suction pad 17 by removing the negative pressure. By performing such transfer operation, an article W held in a second container C2 in a proper attitude can be placed in a first container C1 in a proper attitude.

Note that the transfer device 3 is, or corresponds to, the loading member configured to load a target article TW into a first container C1 (first support member).

(Imaging Device, Weighing Device, and Detection Device)

Figure 10:
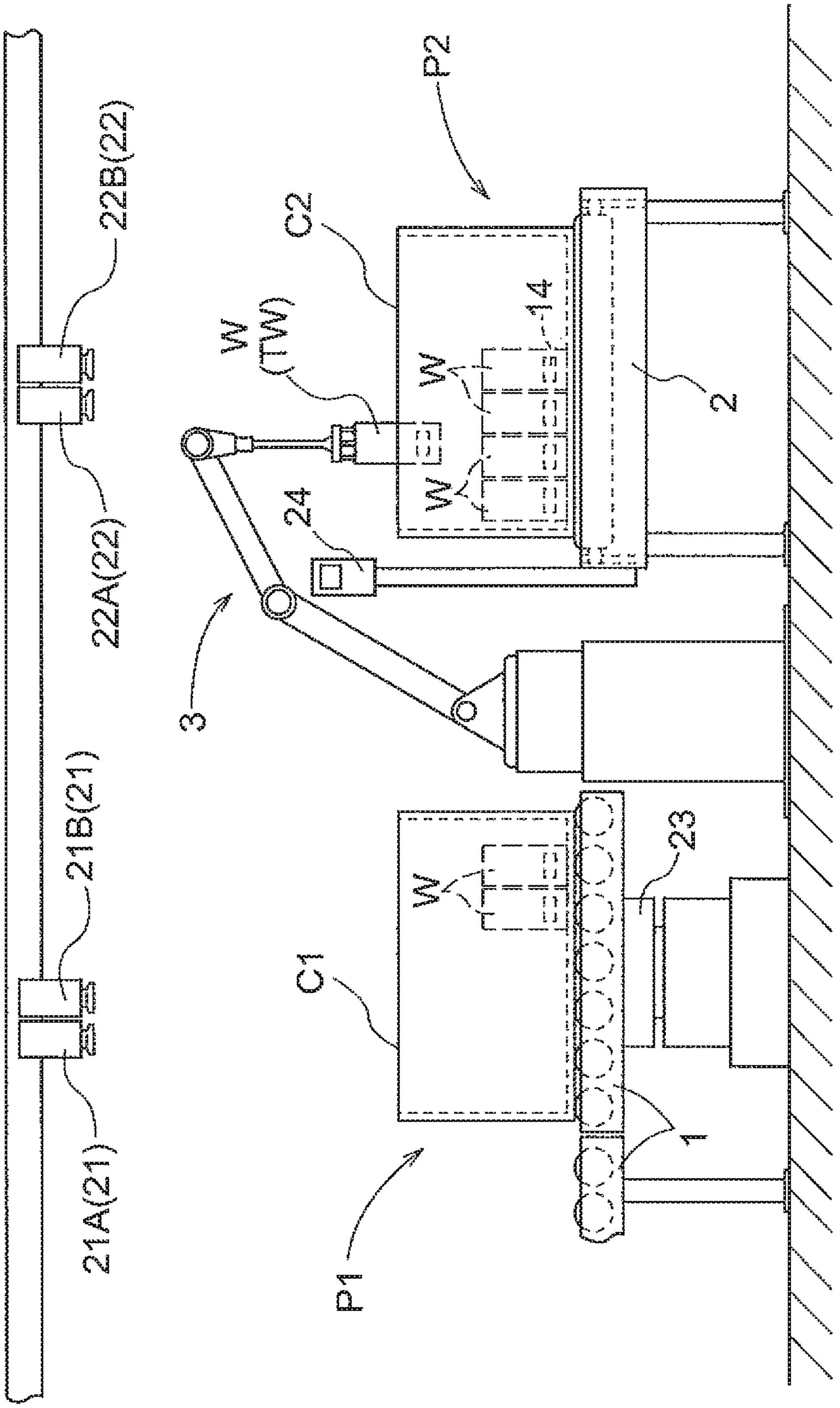
FIG. 10 shows how various devices operate and also shows a first position and the second position.

As shown in FIG. 10, the article loading facility includes a first imaging device 21 configured to capture at least one article W held in a first container C1, a second imaging device 22 configured to capture at least one article W held in a second container C2, a weighing device 23 configured to measure weight(s) of one or more articles W held in the first container C1, and a kind detection device 24 configured to read a kind code of an article W held by the transfer device 3.

The first imaging device 21 is located at a position that corresponds to the first position P1 so as to be able to capture an image of one or more articles W held in a first container C1 located at the first position P1. The first imaging device 21 is a stereoscopic camera which has a first camera 21A and a second camera 21B. Each of the first camera 21A and the second camera 21B is so located to capture from above an image of a first container C1 located at the first position P1 so as to be able to capture an image of one or more articles W held in the first container C1. Note that the first imaging device 21 is, or corresponds to, a height detecting device configured to detect the height (vertical position) of at least one article W supported by the support member.

The second imaging device 22 is located at a position that corresponds to the second position P2 so as to be able to capture an image of one or more articles W held in a second container C2 located at the second position P2. The second imaging device 22 is a stereoscopic camera which has a third camera 22A and a fourth camera 22B. Each of the third camera 22A and the fourth camera 22B is so located to capture from above an image of a second container C2 located at the first position P1 so as to be able to capture an image of one or more articles W held in the second container C2.

The weighing device 23 is located at a position that corresponds to the first position P1 so as to measure the weight of one or more articles W held in a first container C1 located at the first position P1. More specifically, when a first container C1 is transported to the first position P1, weighing device 23 measures the weight of the first container C1 located at the first position P1. And the weighing device 23 is configured to measure the weight of each article W held in the first container by measuring the weight of the first container C1 each time an additional article is placed in the first container C1 by the transfer device 3 and by calculating the increase in the measured weight.

The kind detection device 24 includes a bar code reader, and is configured to be able to read in kind information of an article W by reading the barcode on the display 14 attached to a surface of the article W. When reading the display 14 with the kind detection device 24, the article W having the display 14 is located at a read position. And by operating the transfer device 3 to position the article W held by the transfer device 3 at a read position, the kind detection device 24 can read the display 14 of the article W held by the transfer device 3.

(Controller)

Figure 3:
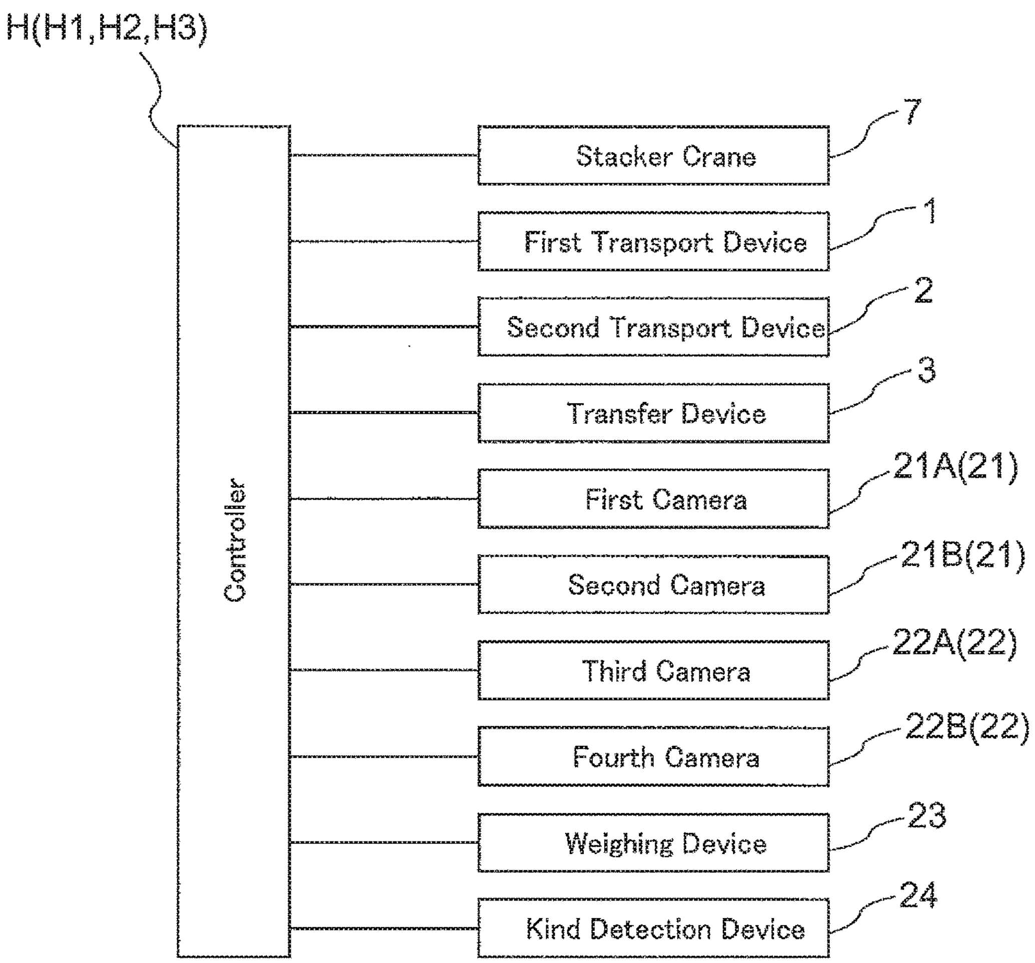
FIG. 3 is a control block diagram.

As shown in FIG. 3, the article loading facility includes a controller H configured to control the first transport device 1, the second transport device 2, the transfer device 3, and the stacker crane 7. The controller H has the functionality of, and performs as, a controller h1 configured to control the transfer device 3. In addition, the controller H has the function of, and performs as, a setting portion h2 that performs an arrangement setting operation in which arrangement information is set which indicates an attitude and position (with respect to the first container C1) of each of one or more target articles TW to be held in a first container C1. In addition, the controller H has the functionality of, and performs as, a memory h3 which stores weight information which indicates the weight of each target article TW, and pattern information which indicates the surface pattern of each target article TW.

The controller H stores goods codes as well as article information which indicates the length, width, height, and weight of articles W of the kind indicated by each goods code, such that the goods codes are associated with respective article information. In addition, the controller H stores stored location ("stored position information") of each second container C2 stored in the automated warehouse 4 as well as the goods code of the articles W held in each second container C2, such that stored position information is associated with the corresponding goods code.

Order information is transmitted to the controller H from a plurality of shipping destinations. The order information includes code information which indicates goods codes that are unique to each kind of articles W, and quantity information which indicates the number of articles W for each kind of articles W that corresponds to each goods code indicated by the code information. In addition, an order number is provided for each order in order information, in the sequential order of transmission of the information from the shipping destinations.

In addition, image information (first image information) captured by the first imaging device 21 is transmitted to the controller H from the first imaging device 21. And image information (second image information) captured by the second imaging device 22 is transmitted to the controller H from the second imaging device. The controller H is configured to be capable of determining the attitude and position of each article W held in the first container C1 located at the first position P1, based on the first image information. In addition, controller H is configured to be capable of determining the attitude and position of each article W held in the second container C2 located at the second position P2, based on the second image information.

Measured weight information which is the weight measured by the weighing device 23 is transmitted from the weighing device 23 to the controller H. And the code information detected by the kind detection device 24 is transmitted from the kind detection device 24 to the controller H. The controller H is configured to be capable of determining the weight of each article W held in the first container C1 located at the first position P1 based on the measured weight information. In addition, the controller H is configured to be capable of determining the kind of article W transferred by the transfer device 3, based on the code information.

Figure 4:
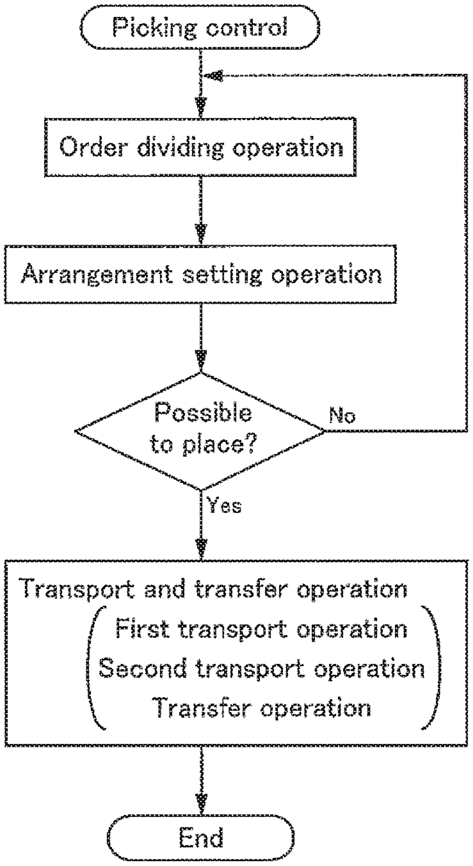
FIG. 4 is a flowchart for a picking control.

As shown in FIG. 4, the controller H performs an order dividing operation, an arrangement setting operation, and a transport and transfer operation, in that order. The order dividing operation is an operation performed to determine the number of first containers C1 into which articles W indicated or specified by order information are to be loaded. The arrangement setting operation is an operation performed to determine arrangement information which indicates the attitude and position with respect to a first container C1 for each of one or more target articles TW to be held in one first container C1. A transport and transfer operation is an operation performed, based on arrangement information, to control the first transport device 1, the second transport device 2, and the transfer device 3 to place one or more target articles TW in the first container C1 with each target article TW in the attitude and position indicated by the arrangement information. The order dividing operation, the arrangement setting operation, and the transport and transfer operation are described in more detail.

(Order Dividing Operation)

In an order dividing operation, the number of first containers C1, into which the articles W indicated or specified in the order information are to be loaded, is determined.

More specifically, the articles W are to be loaded such that the total volume of the articles W to be held in one first container C1 is less than or equal to a set volume of the first container C1 that is to hold the articles W, which depends on the volumes and the number of the articles W to be loaded that are indicated or specified by the order information. Incidentally, in the present embodiment, the set volume is set to be 60% of the maximum volume a first container C1 can hold (i.e., 60% of volume capacity of the first container C1). If the total volume of the articles W to be loaded as specified by order information is 60% or less of the volume capacity of the first container C1, then “1 (one)” is set to be the number of first containers C1 because the articles W to be loaded can be held in one first container C1. If the total volume of the articles W to be loaded as specified by order information is greater than 60% of the volume capacity of the first container C1, then 2 (two) or a greater integer is set as the number of first containers C1 such that the sum of the volumes of the articles W to be held in each first container C1 is 60% or less of the volume capacity.

(Arrangement Setting Operation)

Arrangement setting operation is an operation (1) in which arrangement information is set in advance which indicates the arrangement of articles W for placing in a first container C1 all the articles W of a second kind (which is different from a first kind) to be held in the first container C1 after all articles W of the first kind to be held in a first container C1 are placed in the first container C1, and (2) in which an order determining operation is performed in which a kind order is determined which indicates the order in which a plurality of kinds of articles W are loaded, when loading the plurality of kinds of articles W to be loaded in accordance with the arrangement information. The arrangement information being set in advance means that the arrangement information is set before starting the placing of articles W in the first container C1, i.e. before the start of a transfer operation. In addition, in the arrangement setting operation, the controller H sets, or determines, the arrangement in which the articles W are arranged in one layer or in multiple-layers such that, when articles W are arranged in multiple-layers, the same kind of articles W are preferentially arranged in the same layer.

Figure 5:
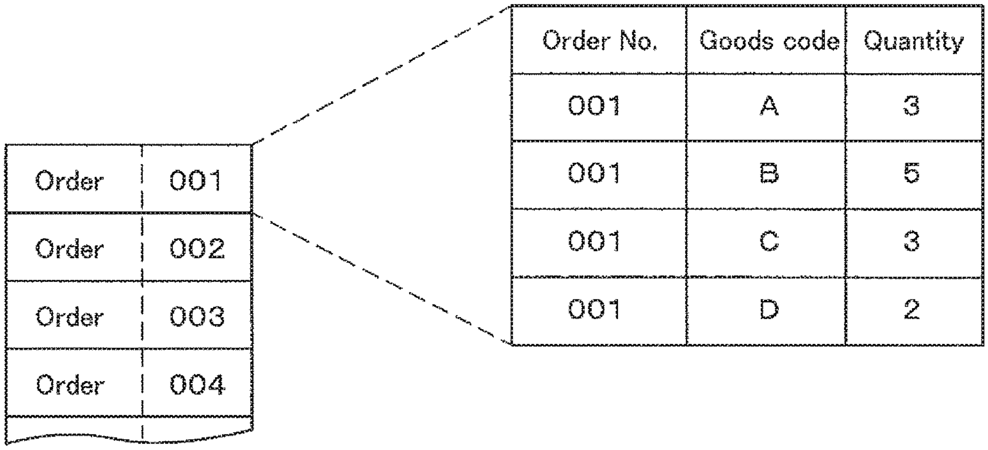
FIG. 5 shows order information before changing the ordering.

More specifically, in the arrangement setting operation, the arrangement of articles W is determined for arranging articles W to be held in a first container C1 (referred to simply hereinafter as “articles W to be held”) in one layer or in multiple-layers. In other words, for example, when there are articles W having goods codes A-D as the articles W to be held, as shown in FIG. 5, the kind order may be set to indicate the order of A, C, B, and D, for example. And, arrangement information that indicates an arrangement for articles W is set so that, of any two kinds of articles W that are in sequence (i.e., one comes immediate before the other: “two sequential kinds”) in the ordering, after all the articles W of the first of the two sequential kinds to be held in the first container C1 are placed in the first container C1, all the articles W (to be held in the first container C1) of the second of the two sequential kinds that is different from the first would be placed in the first container C1. More specifically, arrangement information is set that indicates an arrangement of articles W in which, after placing all articles W having goods code A in the first container C1, all articles W having goods code C would be placed in the first container C1: after placing all articles W having goods code C in the first container C1, all articles W having goods code B would be placed in the first container C1: and, after placing all articles W having goods code B in the first container C1, all articles W having goods code D would be placed in the first container C1.

And, in an arrangement setting operation, a plurality of arrangement patterns are created by making changes to the kind order and/or to the positions and attitudes of the articles W, until a set period elapses after the completion of the order dividing operation. The arrangement patterns created in an arrangement setting operation are created by determining the arrangement of all the article W to be held by determining the arrangement of articles W in the lowest layer and then the articles W in the layer above it, and so on.

And in the arrangement setting operation, among the plurality of arrangement patterns created as described above, one arrangement pattern is preferentially selected for which the total area of portions of the support surface (i.e., a surface (of the first container C1) that supports articles W being held or an upward facing surface of the support portion 11)) that would support the articles W to be held is the largest. And when two arrangement patters have the same total area for the portions that would support the articles W to be held, one arrangement pattern is selected by preferentially choosing the pattern for which the height, from the support surface, of the highest surface of the articles W (to be held) is lower than with the other pattern when the articles W to be held are stacked in multiple-layers in accordance with respective arrangement patterns. As such, in an arrangement setting operation, an arrangement (arrangement pattern) is determined for loading the articles W to be held in one first container C1 into the first container C1 in one layer or in multiple-layers.

The preferential selection, in an arrangement setting operation, of one arrangement pattern for which the total area of portions of the support surface that would support the articles W to be held is the largest is described in more detail next. For example, when the kind order is set to indicate the order of A, B, C, and D, after placing three articles W having goods code A in the first (bottom) layer, four articles W having goods code B can be placed in the first container C1, as shown in FIG. 6. And, for example, when the kind order is set to indicate the order of A, C, B and D, after placing three articles W having goods code A in the first (bottom) layer, three articles W having goods code C can be placed in the first container C1, as shown in FIG. 7. Between a case in which the kind order is set to indicate the order of A, B, C, and D, and a case in which the kind order is set to indicate the order of A, C, B and D, the arrangement pattern having the kind order, that is set to indicate the order of A, C, B and D for which the total area of portions of the support surface that support the articles W to be held is larger, is preferentially selected.

As such, in an order setting operation, the kind order, for which the total area of portions of the support surface that would support the articles W is the largest, is preferentially selected when setting the arrangement to preferentially arrange the same kind of articles W in the same layer in an arrangement setting operation.

Depending on the combination of the kinds and the number(s) of articles W, when the articles W to be held are to be stacked in multiple-layers in accordance with an arrangement pattern, the height from the support surface of the highest surface of the articles W may exceed the height of the first container C1 for any of the arrangement patterns created in the arrangement setting operation as described above. In such a case, the controller H determines that the placement of the articles W is not possible and performs an order dividing operation again. If and when an order dividing operation is performed again, it is conceivable to lower the set volume (for example, to 50%) from the set volume (for example, 60%) in the order dividing operation performed last time.

(Transport and Transfer Operation)

In a transport and transfer operation, a first transport operation, a second transport operation, and a transfer operation are performed to transfer articles W from one or more second containers C2 to one first container C1 and to place the articles W in the first container C1 in the arrangement indicated by arrangement information.

Figure 9:
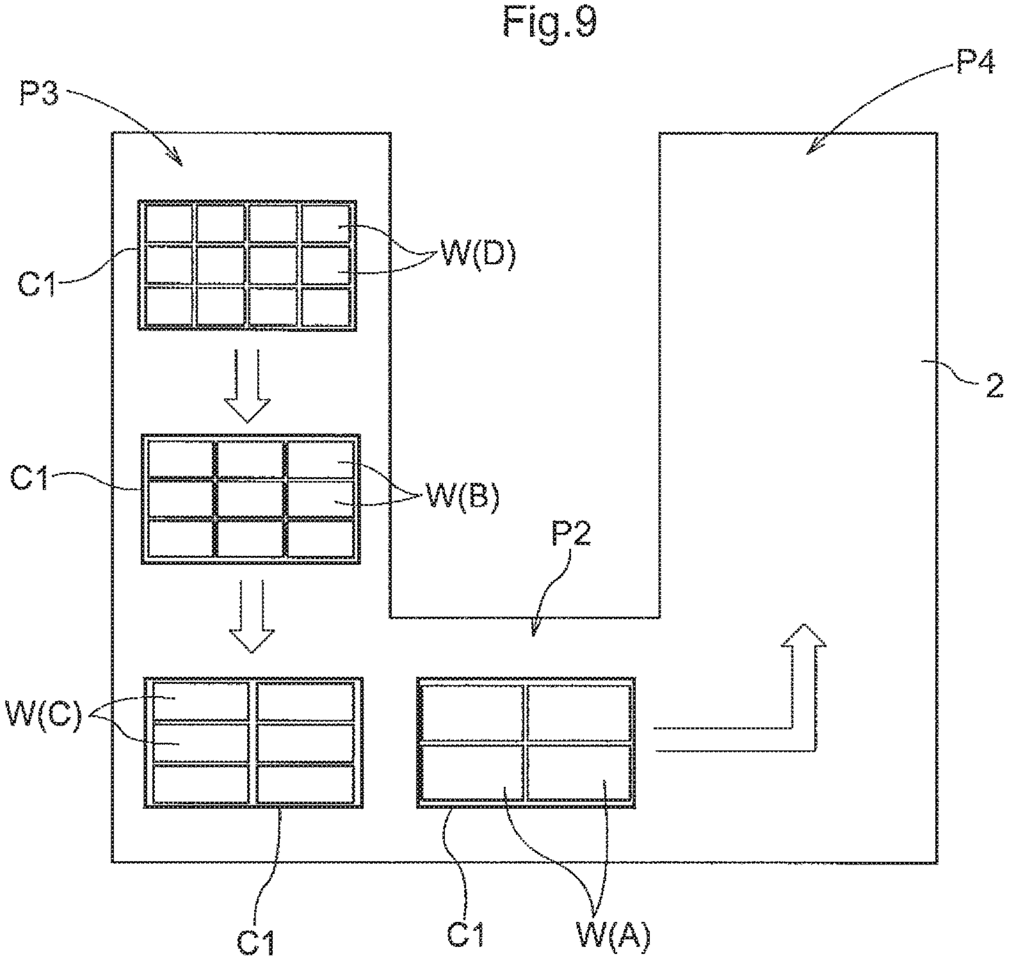

A second transport operation is an operation performed to control the second transport device 2 and the stacker crane 7 to transport one or more second containers C2 from one or more storage racks 6 to the second position P2, and also to transport each second container C2 from the second position P2 to a storage rack 6 after all the articles W held in the second container C2 at the second position P2 have been taken out by the transfer device 3. In addition, in a second transport operation, as shown in FIG. 9, the second containers C2 are transported to the second position P2 such that the kinds of articles W held in the second containers C2 being transported to the second position P2 are in the order indicated by the kind order.

The first transport operation is an operation performed (in parallel with the second transport operation) to control the first transport device 1 to transport an empty first container C1 from an outside location to the first position P1 and also to transport the first container C1 from the first position P1 to an outside location after all the articles W have been placed in the first container C1 at the first position P1 by the transfer device 3.

The transfer operation is an operation performed to control the transfer device 3 to take out, one article W at a time, the articles W held in a second container C2 at the second position P2 and to place, one article at a time, the articles W in the first container C1 at the first position P1 in the arrangement indicated by the arrangement information.

As such, the amount of time required to load a plurality of articles W into the first container C1 can be shortened because a second container C2 holding articles W is transported to the second position P2 so that a plurality of articles W can be transported to the second position P2 together, and because it is unnecessary to repeatedly bring a second container C2 that holds the same kind of articles W to the second position P2.

(Transfer Operation)

The transfer operation is described next.

In a transfer operation, in addition to controlling the transfer device 3 as described above, first determining operations, a second determining operation, a third determining operation, a fourth determining operation, and a fifth determining operation are performed.

A first determining operation is an operation performed to determine the attitude and position of at least one article W held in a first container C1 based on first image information which is information captured by the first imaging device 21.

To describe this in more detail, a first determining operation is performed before transferring a target article TW from the second container C2 to the first container C1. And another first determining operation is performed after the target article TW has been transferred from the second container C2 to, and placed in, the first container C1. In the first determining operation, firstly, the first imaging device 21 is controlled to operate the first imaging device 21 (the first camera 21A and the second camera 21B) with the first container C1 located at the first position P1 to capture an image of at least one article W held in the first container C1 located at the first position P1. In the first determining operation, secondly, the position(s) and attitude(s) of at least one article W held in the first container C1 are determined based on the first image information captured by the first imaging device 21.

The second determining operation is an operation performed to determine whether it is possible to place a target article TW in the first container C1 in the attitude and position indicated by the arrangement information based on arrangement information as well as attitude and position information which is information about the attitude and position of at least one article W determined by the first determining operation.

To describe this in more detail, the second determining operation is an operation performed before transferring the target article TW from the second container C2 to the first container C1. In other words, with first attitude and position information being defined as attitude and position information obtained in the first determining operation that is performed before transferring the target article TW from the second container C2 to the first container C1, the second determining operation is performed to compare the position and attitude of an article W held in the first container C1 indicated by the first attitude and position information with the position and attitude of the target article TW indicated by the arrangement information. And if one or more articles W already held in the first container C1 are held in the position and the attitude in which the article W to be transferred should be held, then it is determined that it is possible to place the target article TW in the first container C1. And if one or more articles W already held in the first container C1 are not held in the position and the attitude in which the article W to be transferred should be held, then it is determined that it is impossible to place the target article TW in the first container C1.

The third determining operation is an operation performed to determine whether at least one article W is properly placed in the first container C1, based on arrangement information, weight information, attitude and position information, and measured weight information which is information measured by the weighing device 23.

To describe this in more detail, the third determining operation is an operation that is performed after the target article TW has been transferred from the second container C2 to, and placed in, the first container C1 and is performed every time a target article TW is transferred from the second container C2 to, and placed in, the first container C1. In other words, with second attitude and position information being defined as attitude and position information obtained in the first determining operation that is performed after transferring a target article TW from the second container C2 to, and placing it in, the first container C1, the third determining operation is performed to compare the position and attitude of an article W held in the first container C1 indicated by the second attitude and position information with the position and attitude of the target article TW indicated by the arrangement information, to determine whether one or more articles W that includes the target article TW and that are held in the first container C1 are held in the first container C1 in the position(s) and the attitude(s) in which the one or more articles W should be held. In addition, in the third determining operation, the amount of increase in the weight (weight of the first container C1 including the article W held within it) of the first container C1 caused by the target article TW being transferred from the second container C2 to the first container C1 is compared with the weight of the target article TW indicated by the weight information therefor to determine whether the kind of the article W held in the first container C1 is in agreement with the kind of the target article TW indicated by the arrangement information.

And if (1) one or more articles W that includes the target article TW and that are held in the first container C1 are held in the first container C1 in the attitude(s) and the position(s) that such one or more articles W should be held in, and (2) the kind of the article W (that was loaded most recently) held in the first container C1 is in agreement with the kind of the target article TW as indicated by the arrangement information, then the controller H determines that the article W (that was loaded most recently) has been properly placed in the first container C1. And if one or both of these conditions (1) and (2) above is/are not satisfied, then the controller H determines that the article W (that was loaded most recently) has not been properly placed in the first container C1.

The fourth determining operation is an operation performed to determine whether the kind of an article W selected from at least one articles W held in the second container C2 is in agreement with the kind of the target article TW indicated by the arrangement information, based on arrangement information as well as second image information which is information captured and obtained by the second imaging device 22.

To describe this in more detail, the fourth determining operation is an operation performed before transferring the target article TW from the second container C2 to the first container C1. In other words, based on the second image information captured by the second imaging device 22 before transferring the target article TW from the second container C2 to the first container C1, the fourth determining operation is performed to compare the pattern information on a surface of the article W held in the second container C2 with the pattern information on the surface for the kind of the target article TW as stored in the controller H. And if the pattern information on the surface of the article W held in the second container C2 is in agreement with the pattern information on the surface for the kind of the target article TW as stored in the controller H, then it is determined that the kind of article W held in the second container C2 is in agreement with the kind of the target article TW indicated by the arrangement information. And if the pattern information on the surface of the article W held in the second container C2 is not in agreement with the pattern information on the surface for the kind of the target article TW as stored in the controller H, then it is determined that the kind of article W held in the second container C2 is not in agreement with the kind of the target article TW indicated by the arrangement information.

The fifth determining operation is an operation in which it is determined whether the kind of article W currently held by the transfer device 3 is in agreement with the kind of target article TW indicated by the arrangement information, based on the arrangement information as well as the kind information detected by means of the kind detection device 24.

To describe this in more detail, the fifth determining operation is an operation performed while the target article TW is being transferred from the second container C2 to the first container C1. In other words, the controller H controls the kind detection device 24 to read the display 14 with the kind detection device 24 while the target article TW is located at a read position, and compares the kind of the target article TW determined based on the goods code read in by the kind detection device 24 with the kind of the target article TW indicated by the arrangement information. And if the kind of the target article TW determined based on the goods code read in by the kind detection device 24 is in agreement with the kind of the target article TW indicated by the arrangement information, it is determined that the kind of the article W being held by the transfer device 3 is in agreement with the kind of the target article TW as indicated by the arrangement information. And if the kind of the target article TW determined based on the goods code read in by the kind detection device 24 is not in agreement with the kind of the target article TW indicated by the arrangement information, it is determined that the kind of the article W currently held by the transfer device 3 is not in agreement with the kind of the target article TW as indicated by the arrangement information.

Figure 11:
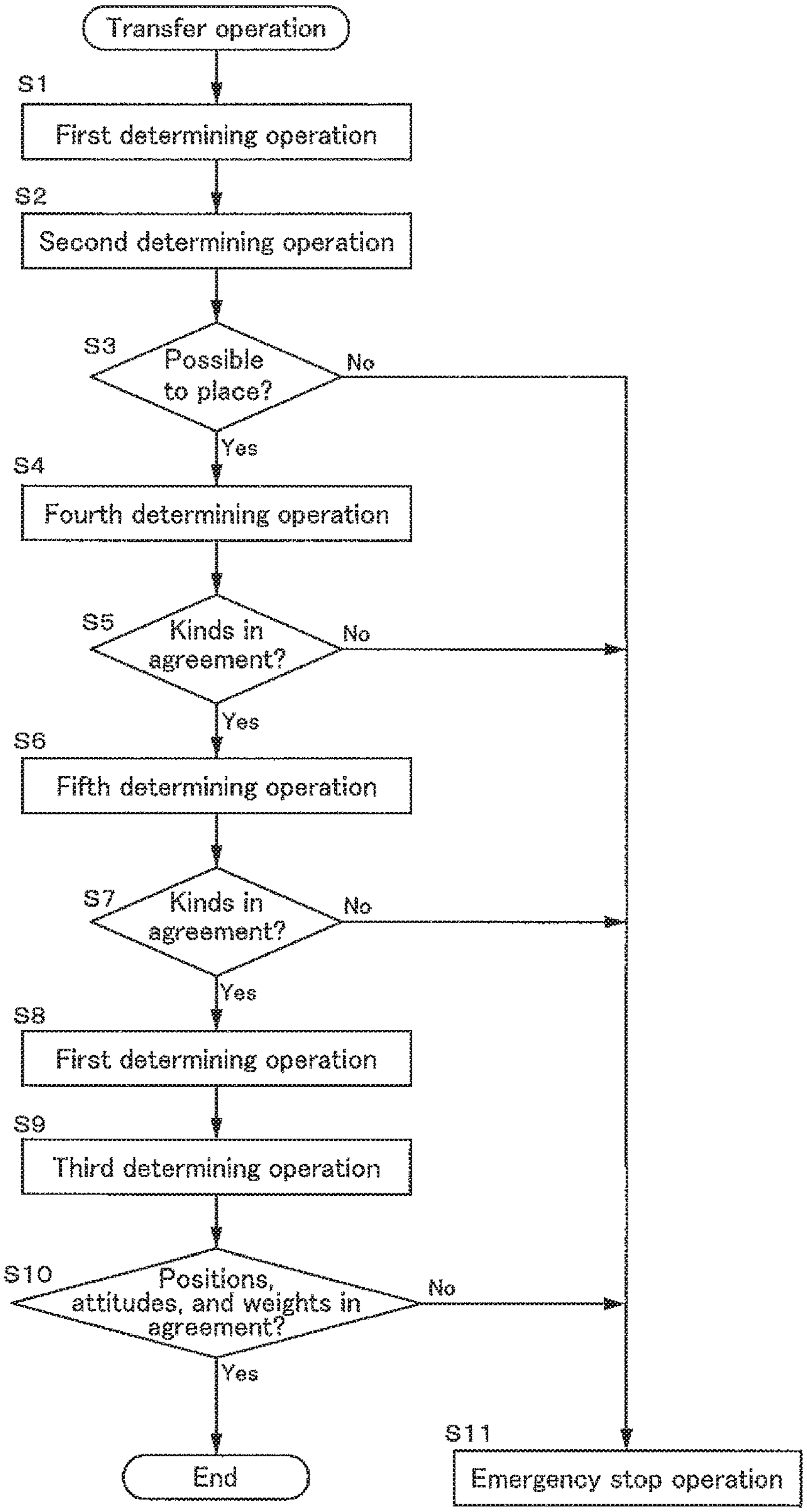
FIG. 11 is a flowchart for a transfer operation.

The transfer operation is described next with reference to the flowchart of FIG. 11. If and when there are two or more target articles TW indicated by the arrangement information, the plurality of target articles TW are transferred from the second container C2 to, and placed in, the first container C1 by performing the transfer operation a plurality of times.

In the transfer operation, a first determining operation is performed (at S1) to generate first attitude and position information, before initiating the transferring of a target article TW with the transfer device 3.

Next, the second determining operation is performed to determine whether a target article TW can be held in the first container C1 in the attitude and position indicated by the arrangement information (S2, S3). When it is determined that the target article TW can be held in the first container C1, the control proceeds to the next determining operation. And when it is determined that the target article TW cannot be held in the first container C1, the control proceeds to an emergency stop operation (S11). This emergency stop operation is an operation for stopping the operation of the transfer device 3 and suspending the transfer operation.

Next, the fourth determining operation is performed to determine whether the kind of the article W held in the second container C2 is in agreement with the kind of the target article TW indicated by the arrangement information (S4, S5). And if in agreement, the control proceeds to the next determining operation. And if not in agreement, the control proceeds to the emergency stop operation (S11).

Next, the transferring of the target article TW from the second container C2 to the first container C1 by the transfer device 3 is started or initiated. And the fifth determining operation is performed during the transfer operation to determine whether the kind of the article W currently held by the transfer device 3 is in agreement with the kind of the target article TW indicated by the arrangement information (SG, S7). And if in agreement, the control proceeds to the next determining operation. And if not in agreement, the control proceeds to the emergency stop operation (S11).

Next, after the transferring of the target article TW has been completed and the target article TW is placed in the first container C1 by the transfer device 3, the first determining operation is performed to generate the second attitude and position information (S8).

Next, the third determining operation is performed to determine whether the article W is properly placed in the first container C1 (S9, S10) based on the position, the attitude, and the weight of the article W. And if the article W is determined to be properly placed, the control proceeds to the transfer operation for the next target article TW. And if the article W is determined to be not properly loaded, the control proceeds to the emergency stop operation (S11).

As such, in the transfer operation, the following are checked: (1) before transferring the target article TW from the second container C2 to the first container C1, the kind of target article TW is to be transferred is checked in the fourth determining operation to see if it is in agreement with the kind of target article TW indicated by the arrangement information; (2) during the transferring of the target article TW from the second container C2 to the first container C1, the kind of the target article TW being transferred is checked, in the fifth determining operation, to see if it is in agreement with the kind of target article TW indicated by the arrangement information; and (3) after the target article TW is transferred from the second container C2 to, and placed in, the first container C1, it is checked, in the third determining operation, to see if the target article TW transferred is properly placed in the first container C1. Thus, the first container C1 can be prevented from being transported from the first position P1 before it is transported away with an article W being held in the first container C1 in a position and attitude different from the position and attitude indicated by the arrangement information and/or with an article W of a kind different from the kind indicated by the arrangement information being held in the first container C1.

2. Other Embodiments

Other embodiments of an article loading facility are described next.

(1) In the embodiment described above, the first determining operations, the second determining operation, the third determining operation, the fourth determining operation, and the fifth determining operation are performed. However, of the first determining operations, the second determining operation, the third determining operation, the fourth determining operation, and the fifth determining operation, only the first determining operations, the second determining operation, and the third determining operation may be performed. Alternatively, only one of the fourth determining operation and the fifth determining operation may be performed, in addition to the first determining operations, the second determining operation, and the third determining operation.

(2) In the embodiment described above, for each target article TW, the first determining operation is performed twice, namely, once before transferring a target article TW from a second container C2 to a first container C1 and once after the article has been transferred to, and placed in, the first container C1. However, the first determining operation may be performed only once for each target article TW by using the second attitude and position information (obtained after a target article TW has been transferred from the second container C2 to, and placed in, the first container C1) as the first attitude and position information for the next target article TW.

(3) In the embodiment described above, an image of the entire interior of a first container is captured from above by the first imaging device. However, an image of only a part of the interior of a first container may be captured from above such that an image of the article W that was the target article TW within the first container is captured by the first imaging devce.

(4) In the embodiment described above, the third determining operation is performed each time a target article TW is transferred. However, the third determining operation may be performed after two or more target articles TW have been transferred, for example, when all of the target articles TW indicated by the arrangement information have been transferred.

(5) In the embodiment described above, the kind information is displayed in the form of a barcode on a detected portion, and the kind detection device is a bar code reader. However, the manner in which the kind information is displaced on the detected portion may be changed suitably. For example, an IC tag that stores the kind information may be used as a detected portion. In addition, commonly used information, such as JAN, EAN, or GTIN code system etc. may be used as the kind information. In addition, a information system unique to the article loading facility may be used as the kind information. The kind detection device may be any device as long as it can detect the kind information of a detected portion. For example, when an IC tag is used as a detected portion, an IC tag reader is used as the kind detection device.

(6) In the embodiment described above, the arrangement indicated by arrangement information is one in which the articles W are arranged in one layer or in multiple-layers. However, the arrangement indicated by the arrangement information may be one in which the articles W are arranged in only one layer.

(7) In addition, an arrangement disclosed in any of the embodiments described above can also be used in combination with any arrangement disclosed in any other embodiment unless inconsistency arises. Regarding any other arrangements and features, the embodiments disclosed in the present description are provided for the purposes of illustration only regarding all aspects. Therefore, it is possible to make various suitable changes without departing from the spirit of the present disclosure.

3. Summary of Embodiments Described Above

A brief summary of the article loading facility described above is provided next.

An article loading facility comprises: a loading member configured to load a target article into a support member into which a plurality of articles can be loaded; a controller configured to control the loading member; a setting portion configured to perform an arrangement setting operation to set arrangement information that indicates an attitude and position of each of the one or more target articles to be loaded into the support member, with respect to the support member; wherein the controller is configured to control the loading member based on the arrangement information such that each of the one or more target articles is placed in the support member in an attitude and position indicated by the arrangement information.

Further provided are: an imaging device configured to capture an image of at least one article placed in the support member; a weighing device configured to measure a weight of at least one article placed in the support member; a memory configured to store weight information which is information that indicates a weight of each of the one or more target articles; wherein the controller is configured to perform a first determining operation, a second determining operation, and a third determining operation, wherein the first determining operation is an operation in which an attitude and position of at least one article that is placed in the support member is determined based on image information which is information captured by the imaging device, wherein the second determining operation is an operation in which it is determined whether it is possible to place a target article in the support member in an attitude and position indicated by the arrangement information based on the arrangement information and attitude and position information which is information about the attitude and position of the at least one article determined by the first determining operation, and wherein the third determining operation is an operation in which it is determined whether at least one article is properly placed in the support member based on the arrangement information, the weight information, the attitude and position information, and measured weight information which is information measured by the weighing device.

With the arrangement described above, the controller can, in the first determining operation, cause the imaging device to capture an image of at least one article placed in the support member and also can determine the attitude and position of the at least one article placed in the support member based on the image information captured by the imaging device. In other words, by performing the first determining operation before loading a target article into the support member, the controller can determine the positions and attitudes of one or more articles already placed in the support member before the loading of the target article. In addition, by performing another first determining operation after placing the target article in the support member, the controller can determine the positions and attitudes of the articles placed in the support member, including the target article.

And the controller can, in the second determining operation, determine whether it is possible to place the target article (to be loaded next into the support member) in the support member in the position and attitude indicated, or specified, by the arrangement information based on the attitude and position information (information about the attitude and position of at least one article placed in the support member) obtained by performing the first determining operation performed before loading the target article into the support member and on the arrangement information (information about the position and attitude of the target article to be loaded next into the support member).

The controller can, in the third determining operation, determine whether the article has been properly placed in the support member in the position and attitude indicated by the arrangement information based on the arrangement information and on the attitude and position information obtained by performing another first determining operation after placing the target article in the support member. In addition, the controller can, in the third determining operation, determine, based on the arrangement information and the measured weight information, as to whether the article of the kind indicated by the arrangement information has been properly placed in the support member by comparing the weight of the target article placed in the support member with the weight of the target article indicated by the arrangement information. As such, it is possible to make a determination as to whether the article placed in the support member is in the position and attitude, and also is of the kind, as indicated by the arrangement information, based on the image information from the imaging device and the measured weight information from the weighing device. A proper responsive action can be taken if and when the article placed in the support member is not in the position and attitude as indicated by the arrangement information, or if and when the article placed in the support member is not of the kind indicated by the arrangement information. In addition, since the imaging device for performing the second determining operation is used as the imaging device for performing the third determining operation, it is not necessary to provide an additional imaging device for exclusively performing the third determining operation. Thus, the arrangement for performing the third determining operation can be provided inexpensively.

Here, with the support member being a first support member, the imaging device being a first imaging device, and the image information being a first image information, the article loading facility preferably further comprises a second imaging device configured to capture an image of a surface of at least one article placed in a second support member provided separately from the first support member, wherein the one or more target articles preferably include a plurality of kinds of articles with a surface pattern of one kind of articles being different from a surface pattern of a different kind of articles, wherein the arrangement information preferably includes information that indicates a kind of each of the one or more target articles, wherein the controller is preferably configured to select a target article from at least one article placed in the second support member, and to control the loading member to hold the target article and to transfer the target article to the first support member, wherein the controller is preferably configured to perform a fourth determining operation in which it is determined whether the kind of the article selected from the at least one article placed in the second support member is in agreement with a kind of the target article indicated by the arrangement information based on the arrangement information and second image information which is information captured by the second imaging device.

With the arrangement described above, a target article is placed in the first support member as a result of the controller selecting a target article from at least one article placed in the second support member and controlling the loading member to hold the target article and to transfer the target article to the first support member.

And by performing the fourth determining operation, the controller can determine whether the kind of the article which is the target article placed in the second support member is in agreement with the kind of target article indicated by the arrangement information. In other words, information about the kinds of the articles is also included in the arrangement information used for placing articles in the first support member; thus, it is possible to make a determination as to whether the kind of an article placed in the second support member is in agreement with the kind of the target article, before transferring the target article from the second support member to the first support member with the loading member. Thus, accidentally loading an article of a kind different from the kind indicated by the arrangement information into the first support member can be prevented before such loading takes place.

In addition, with the support member being a first support member, the article loading facility preferably further comprises a kind detection device configured to detect kind information of an article being held by the loading member, wherein the one or more target articles preferably include a plurality of kinds of articles, wherein each of the one or more target articles is preferably provided with a detected portion which provides kind information that indicates a kind of a corresponding target article, wherein the arrangement information preferably includes information that indicates a kind of each of the one or more target articles, wherein the controller is preferably configured to select a target article from at least one article placed in a second support member provided separately from the first support member, and to control the loading member to hold the target article and to transfer the target article to the first support member, and wherein the controller is preferably configured to perform a fifth determining operation in which it is determined whether a kind of the article being held by the loading member is in agreement with a kind of the target article indicated by the arrangement information based on the arrangement information and the kind information detected by the kind detection device.

With the arrangement described above, a target article is loaded into and placed in the first support member as a result of the controller selecting a target article from at least one article placed in a second support member provided separately from the first support member, and controlling the loading member to hold the target article and to transfer the target article to the first support member.

And by performing the fifth determining operation, the controller can determine whether the kind of the article that is being held by the loading member is in agreement with the kind indicated by the arrangement information. In other words, information about the kinds of the articles is also included in the arrangement information used for placing the articles in the first support member; thus, a determination can be made as to whether the kind of the article being held by the loading member is in agreement with the kind indicated by the arrangement information during the transferring of the target article from the second support member to the first support member with the loading member. Thus, accidentally loading an article of a kind different from the kind indicated by the arrangement information into the first support member can be prevented before such loading takes place.

In addition, the setting portion is preferably configured to, in the arrangement setting operation, set an arrangement of the one or more target articles such that articles are arranged in one layer or in multiple-layers in the support member, and wherein article loading facility preferably includes a height detecting device which is configured to detect a vertical position of at least one article supported by the support member.

With the arrangement described above, if an arrangement set in the arrangement setting operation is such that the target articles are arranged in multiple-layers in the support member, the controller is required to control the loading member to arrange the target articles in multiple-layers. In such a case, by detecting the heights of the articles placed in the support member based on detected information from the height detecting device, the target article can be placed properly on one or more target articles already placed in the support member before the arrival of the target article.

INDUSTRIAL APPLICABILITY

The technology of the present disclosure can be applied to an article transport facility in which each of target articles is placed in a support member in an attitude and position indicated by arrangement information.

What is claimed is:

1. An article loading facility comprising:

a loading member configured to load a target article into a support member into which a plurality of articles can be loaded;

a controller configured to control the loading member;

a setting portion configured to perform an arrangement setting operation to set arrangement information that indicates an attitude and position of each of one or more target articles to be loaded into the support member, with respect to the support member, wherein the controller is configured to control the loading member based on the arrangement information such that each of the one or more target articles is placed in the support member in an attitude and position indicated by the arrangement information, an imaging device configured to capture an image of at least one article placed in the support member;

a weighing device configured to measure a weight of at least one article placed in the support member; and a memory configured to store weight information which is information that indicates a weight of each of the one or more target articles;

wherein the controller is further configured to perform a first determining operation, a second determining operation, and a third determining operation, wherein the first determining operation is an operation in which an attitude and position of at least one article that is placed in the support member is determined based on image information which is information captured by the imaging device, wherein the second determining operation is an operation in which it is determined whether it is possible to place a target article in the support member in an attitude and position indicated by the arrangement information based on the arrangement information and attitude and position information which is information about the attitude and position of the at least one article determined by the first determining operation, and wherein the third determining operation is an operation in which it is determined whether at least one article is properly placed in the support member based on the arrangement information, the weight information, the attitude and position information, and measured weight information which is information measured by the weighing device.

2. The article loading facility as defined in claim 1, wherein with the support member being a first support member, the imaging device being a first imaging device, and the image information being a first image information, wherein the article loading facility further comprises a second imaging device configured to capture an image of a surface of at least one article placed in a second support member provided separately from the first support member, wherein the one or more target articles include a plurality of kinds of articles with a surface pattern of one kind of articles being different from a surface pattern of a different kind of articles, wherein the arrangement information includes information that indicates a kind of each of the one or more target articles, wherein the controller is configured to select a target article from at least one article placed in the second support member, and to control the loading member to hold the target article and to transfer the target article to the first support member, and wherein the controller is configured to perform a fourth determining operation in which it is determined whether the kind of the article selected from the at least one article placed in the second support member is in agreement with a kind of the target article indicated by the arrangement information based on the arrangement information and second image information which is information captured by the second imaging device.

3. The article loading facility as defined in claim 1, wherein with the support member being a first support member, the article loading facility further comprises a kind detection device configured to detect kind information of an article being held by the loading member, wherein the one or more target articles include a plurality of kinds of articles, wherein each of the one or more target articles is provided with a detected portion which provides kind information that indicates a kind of a corresponding target article, wherein the arrangement information includes information that indicates a kind of each of the one or more target articles, wherein the controller is configured to select a target article from at least one article placed in a second support member provided separately from the first support member, and to control the loading member to hold the target article and to transfer the target article to the first support member, and wherein the controller is configured to perform a fifth determining operation in which it is determined whether a kind of the article being held by the loading member is in agreement with a kind of the target article indicated by the arrangement information based on the arrangement information and the kind information detected by the kind detection device.

4. The article loading facility as defined in claim 1, wherein the setting portion is configured to, in the arrangement setting operation, set an arrangement of the one or more target articles such that articles are arranged in one layer or in multiple-layers in the support member, and wherein article loading facility includes a height detecting device which is configured to detect a vertical position of at least one article supported by the support member.

* * * * *